(12) United States Patent
Ronchetto et al.

(10) Patent No.: US 12,097,765 B2
(45) Date of Patent: Sep. 24, 2024

(54) TRANSMISSION MODULE FOR A HYBRID DRIVE VEHICLE

(71) Applicant: DAYCO EUROPE S.R.L., Chieti (IT)

(72) Inventors: Roberto Ronchetto, Chieti (IT); Alessio Courtial, Turin (IT); Gregorio Luciani, Chieti (IT)

(73) Assignee: DAYCO EUROPE S.R.L., Chieti (IT)

( * ) Notice: Subject to any disclaimer, the term of this patent is extended or adjusted under 35 U.S.C. 154(b) by 417 days.

(21) Appl. No.: 17/596,796

(22) PCT Filed: Jun. 19, 2020

(86) PCT No.: PCT/IB2020/055794
§ 371 (c)(1),
(2) Date: Dec. 17, 2021

(87) PCT Pub. No.: WO2020/255071
PCT Pub. Date: Dec. 24, 2020

(65) Prior Publication Data
US 2022/0297528 A1 Sep. 22, 2022

(30) Foreign Application Priority Data
Jun. 20, 2019 (IT) .................. 102019000009624

(51) Int. Cl.
*F16H 9/04* (2006.01)
*B60K 6/48* (2007.10)
(Continued)

(52) U.S. Cl.
CPC .............. *B60K 6/547* (2013.01); *B60K 6/48* (2013.01); *F16H 9/04* (2013.01); *B60K 2006/4825* (2013.01); *F16H 57/028* (2013.01)

(58) Field of Classification Search
CPC .. B60K 6/547; B60K 6/48; B60K 2006/4825; B60K 6/387; B60K 2006/4833; F16H 9/04; F16H 57/028
See application file for complete search history.

(56) References Cited

U.S. PATENT DOCUMENTS 5,078,655 A * 1/1992 Brandenstein ........ F16H 7/1281
474/107
7,114,585 B2 * 10/2006 Man ...................... B60K 6/365
903/910

(Continued)

FOREIGN PATENT DOCUMENTS

| CN | 108367665 A | 8/2018 |
|---|---|---|
| DE | 3908817 C1 | 5/1990 |
| FR | 3073788 A1 | 5/2019 |

OTHER PUBLICATIONS

PCT/IB2020/055794, International Search Report and Written Opinion, Oct. 2, 2020 (13 pages).

*Primary Examiner* — Derek D Knight
(74) *Attorney, Agent, or Firm* — FisherBroyles, LLP; Susan M. Oiler

(57) ABSTRACT

A transmission module for a hybrid drive vehicle has a tray-like support structure adapted to be fixed to an internal combustion engine and defining a housing for a decoupling clutch, a first power port for connection to an output member of the decoupling clutch, a second power port for connection to an electric machine, and a module transmission having respective transmission members associated with the power ports, and transmission means connecting the transmission members to each other. The power ports are configured so as to be couplable with respective rotating members of the decoupling clutch and of the electric machine by means of respective axially sliding couplings.

21 Claims, 9 Drawing Sheets

(51) Int. Cl.
*B60K 6/547* (2007.10)
*F16H 57/028* (2012.01)

(56) References Cited

U.S. PATENT DOCUMENTS 10,240,657 B2 * 3/2019 Lebas .................. F16F 15/145
2019/0232950 A1 * 8/2019 Atluri .................... H04W 4/02

* cited by examiner

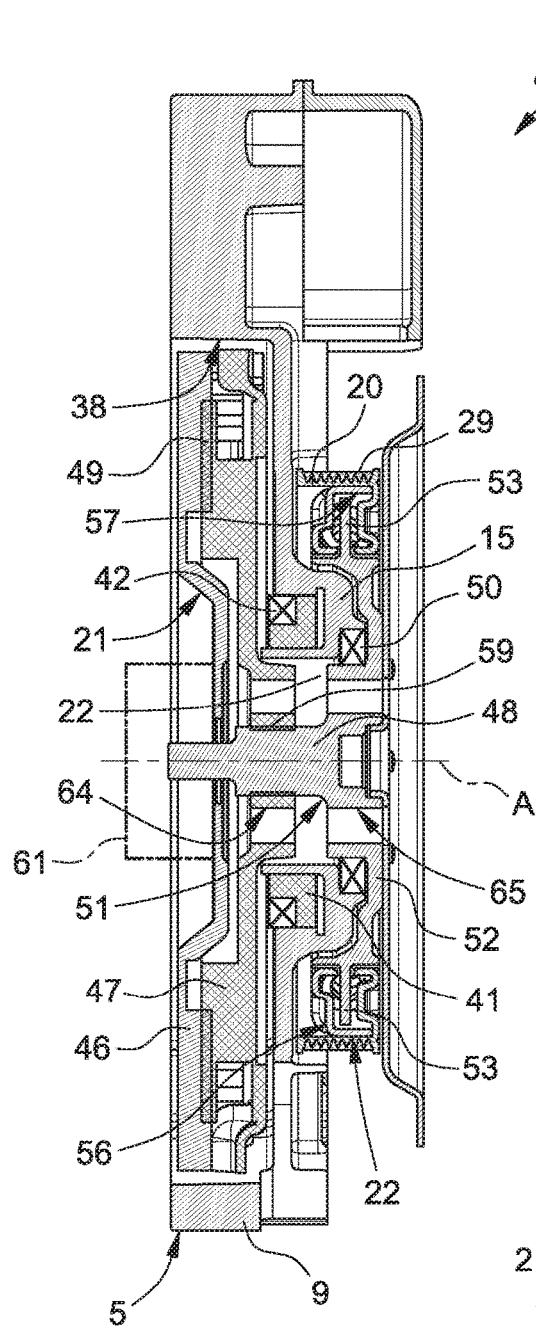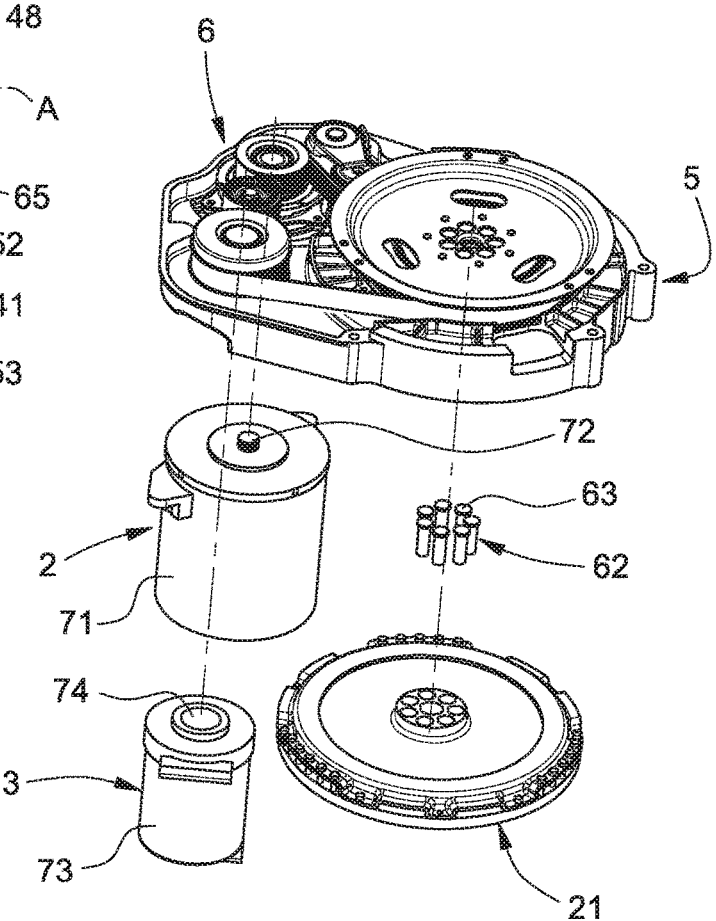
FIG. 8
FIG. 9

TRANSMISSION MODULE FOR A HYBRID DRIVE VEHICLE

CROSS-REFERENCE TO RELATED APPLICATIONS

The present invention is filed under 35 U.S.C. § 371 as the U.S. National Phase of International Patent Application No. PCT/IB2020/055794, filed Jun. 19, 2020, which designated the United States and which claims the benefit of Italian patent application no. 102019000009624, filed on 20 Jun. 2019, the entire disclosure of which is incorporated herein by reference.

TECHNICAL FIELD

The present invention concerns a transmission module for a hybrid drive vehicle, and in particular a transmission module adapted to be interposed between an internal combustion engine and a transmission of a hybrid drive vehicle.

BACKGROUND ART

As is known, hybrid drive vehicles comprise an internal combustion engine and at least an electric machine which can be used as generator or motor for delivering torque in combination with (or alternatively to) the internal combustion engine, according to the vehicle operating conditions.

A configuration in which an electric machine is used connected between the internal combustion engine and the vehicle transmission is conventionally called "P2". Modular units are known adapted to be interposed between the internal combustion engine and the transmission of a vehicle (and therefore currently called "P2 modules") which comprise, in addition to the electric machine, one or more clutches to selectively connect to the transmission the internal combustion engine and/or the electric machine, in addition to the relative actuators and transmission elements.

A problem connected with the known P2 modules, which limits the application thereof, is the relatively large axial dimension.

A further problem is the complexity of installation, due to the fact that said modules comprise relatively heavy parts (for example the electric machine) which have to be accurately centred and supported both with respect to the internal combustion engine and with respect to the module being installed.

DISCLOSURE OF INVENTION

The object of the present invention is the production of a P2 transmission module, which solves the problems connected with the known modules specified above.

The above-mentioned object is achieved by a transmission module for a hybrid drive vehicle configured to be interposed between an internal combustion engine and a vehicle transmission. The transmission module has a tray-like support structure securable to the internal combustion engine defining a housing for a decoupling clutch configured to be interposed between a crankshaft of the internal combustion engine and the transmission module and having a seat for a control actuator of the decoupling clutch axially communicating with the housing. The transmission module has a first power port for connection to an output member (of the decoupling clutch, at least a second power port for connection to an electric machine, and a module transmission comprising a first transmission member connected to the first power port by means of a torsional vibration damper, a second transmission member connected to the second power port, and transmission means for rotationally coupling said transmission members to one another. The first and second power ports are configured so as to be couplable with respective rotating members of the decoupling clutch and of the electric machine by means of respective axially sliding couplings.

BRIEF DESCRIPTION OF THE DRAWINGS

For a better understanding of the present invention, a preferred embodiment is described below with reference to the attached drawings, in which:

FIGS. 7 and 8 are sections along the lines VII-VII and VIII-VIII respectively of FIG. 6;

FIG. 9 is an exploded perspective view of the hybrid unit;

BEST MODE FOR CARRYING OUT THE INVENTION

Figure 1:
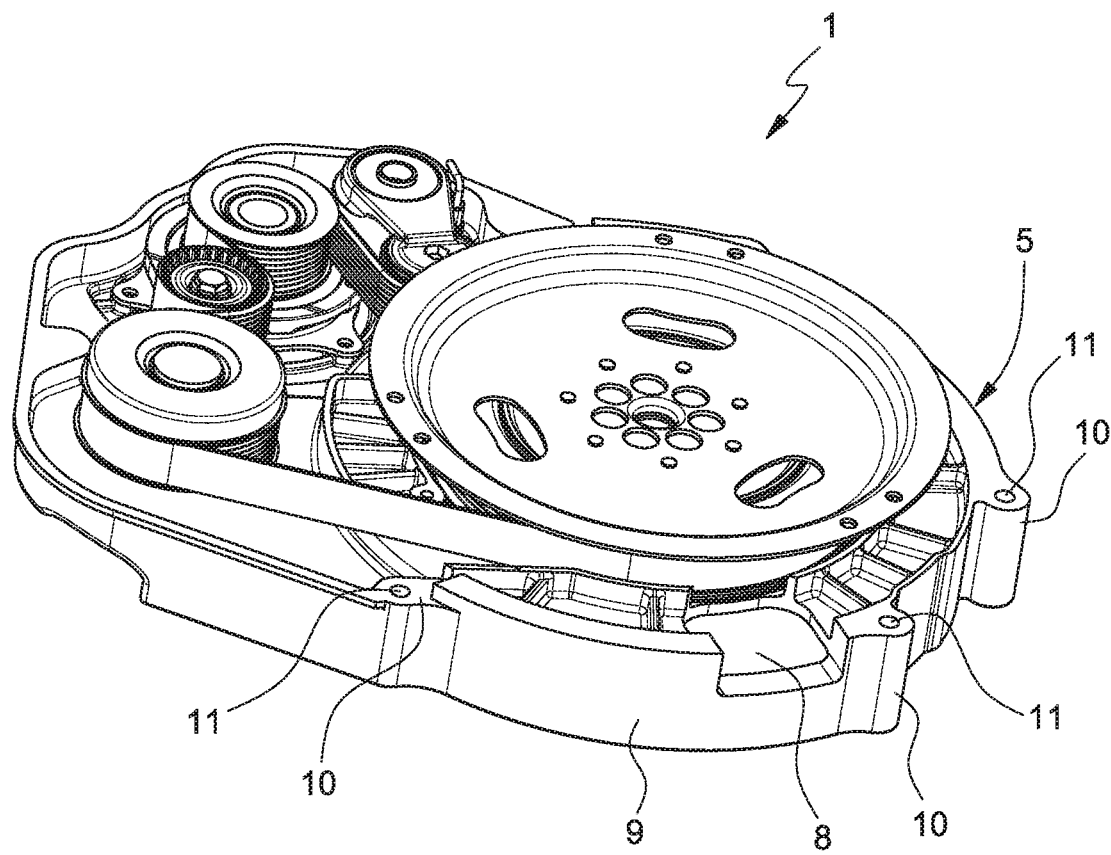
FIG. 1 is a perspective view of a transmission module according to the present invention.
Figure 2:
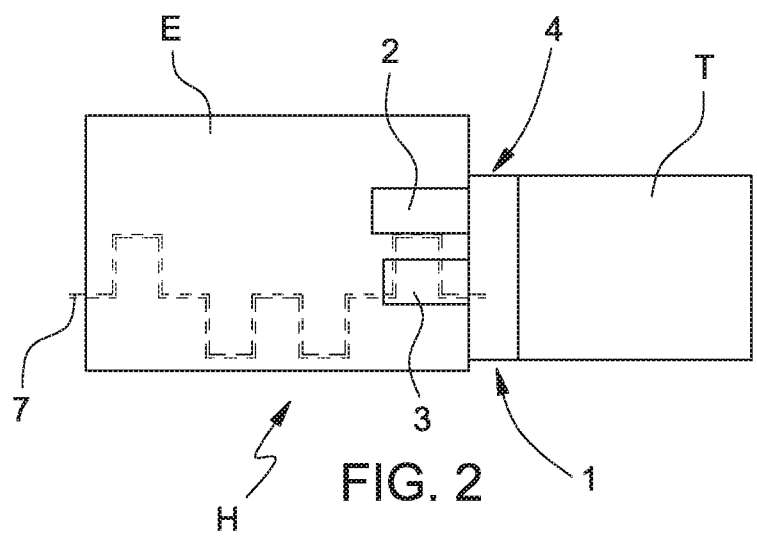
FIG. 2 is a diagram of a hybrid drive unit of a vehicle comprising the module of the invention.
Figure 3:
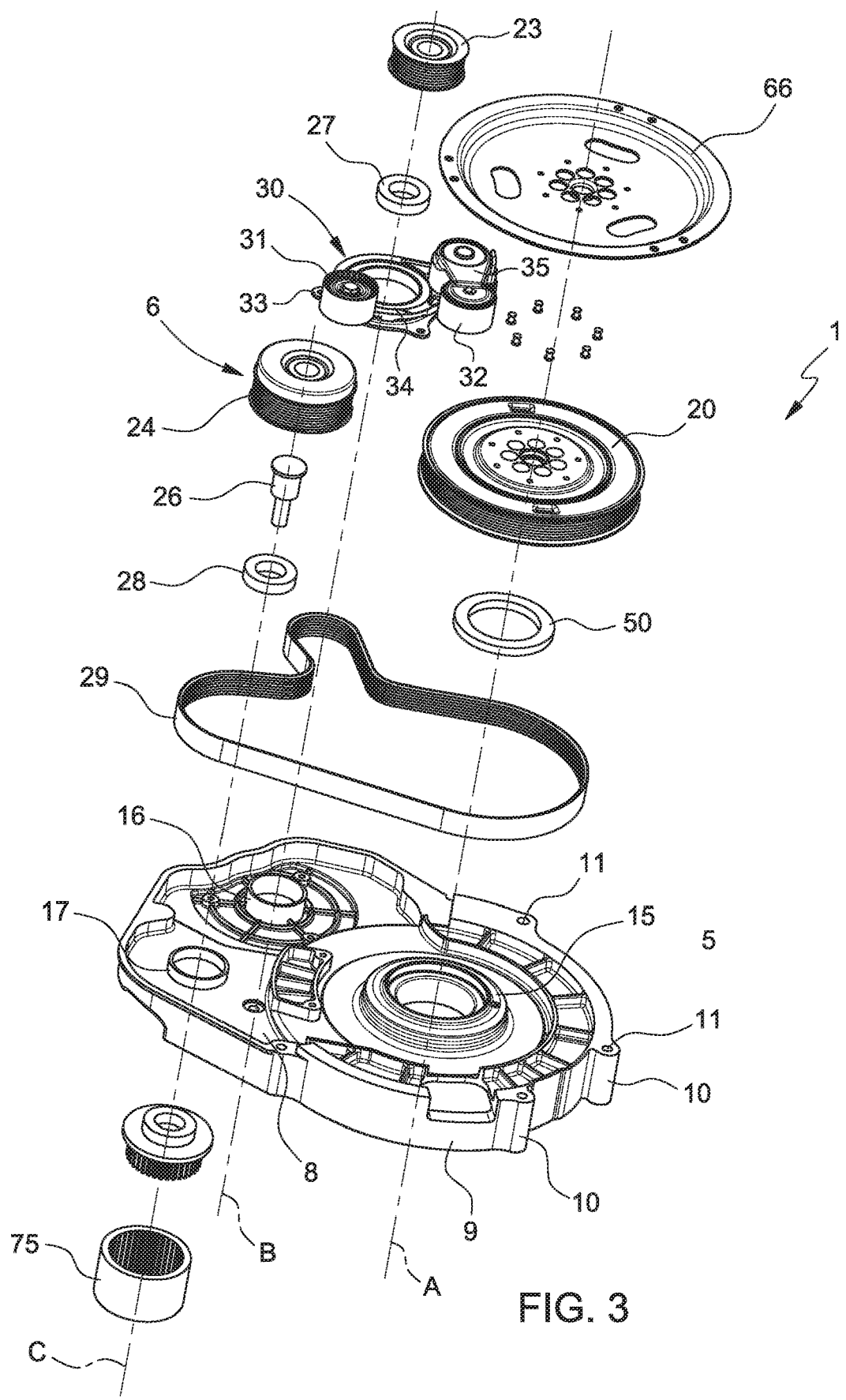
FIG. 3 is an exploded perspective view of the module of FIG. 1.

With reference to FIGS. 1 and 2, the number 1 indicates overall a P2 transmission module adapted to be connected between an internal combustion engine E and a transmission T of a hybrid drive vehicle, forming overall a hybrid drive unit H.

The module 1 is part of a hybrid unit 4 (FIGS. 3-11) comprising, apart from the module itself, an electric machine 2 and one or more accessories such as, for example, a compressor 3 for an air conditioning system of the vehicle. The electric machine 2 is expediently of reversible type, namely it can operate as an electric motor to deliver torque to the transmission (in combination with or alternatively to the internal combustion engine) or as a generator to generate electric power.

The module 1 essentially comprises a tray-like support structure 5 and a transmission 6, in this example by belt, housed in the support structure 5 and configured to operatively and selectively connect to one another a crankshaft 7 of the internal combustion engine E, the electric machine 2 and the transmission T.

The support structure 5 has a substantially flat base wall 8 and a perimeter flange 9 extending perpendicular to it and forming a plurality of enlargements 10 in which the holes are obtained for fastening the module 1 to the engine E. From the base wall 8 respective tubular appendages 15, 16, 17 extend axially (FIG. 3), each of which internally defining a through seat. The tubular appendages 15, 16, 17 have axes A, B and C coinciding respectively with the axis of the crankshaft 7 of the engine E, with the axis of the electric machine 2 and with the axis of the compressor 3, as will be better described below.

Figure 4:
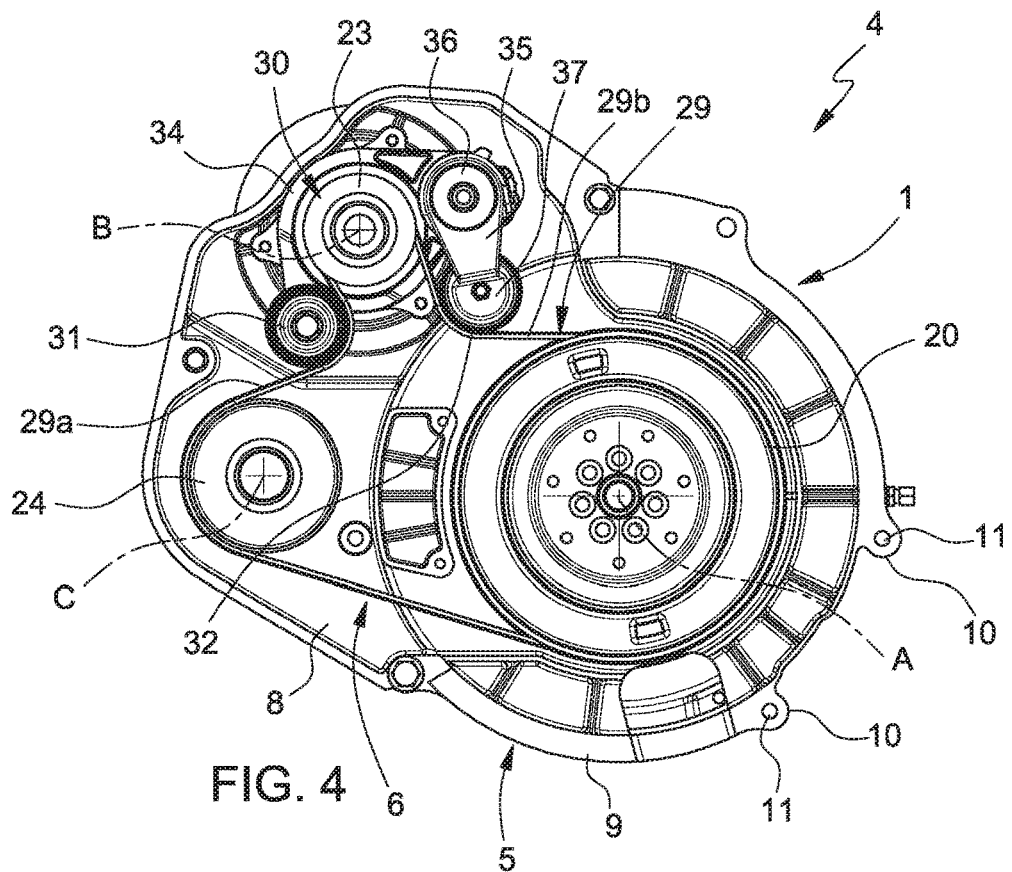
FIGS. 4, 5 and 6 are front elevation, rear perspective and rear elevation views respectively of a hybrid unit comprising the transmission module of FIG. 1.
Figure 5:
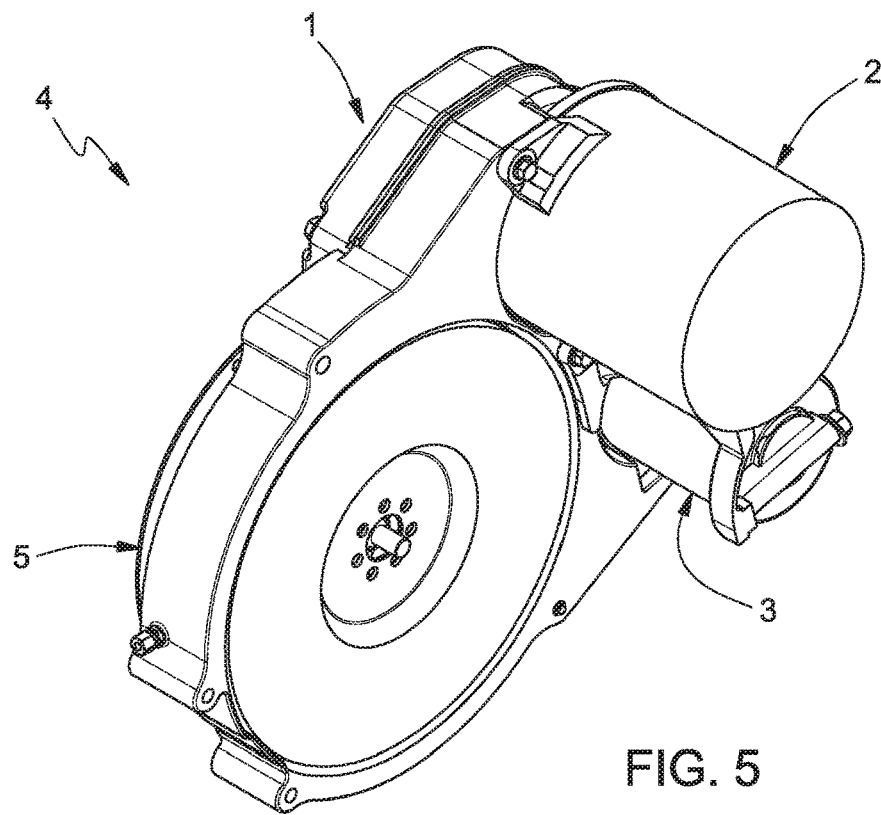
Figure 6:
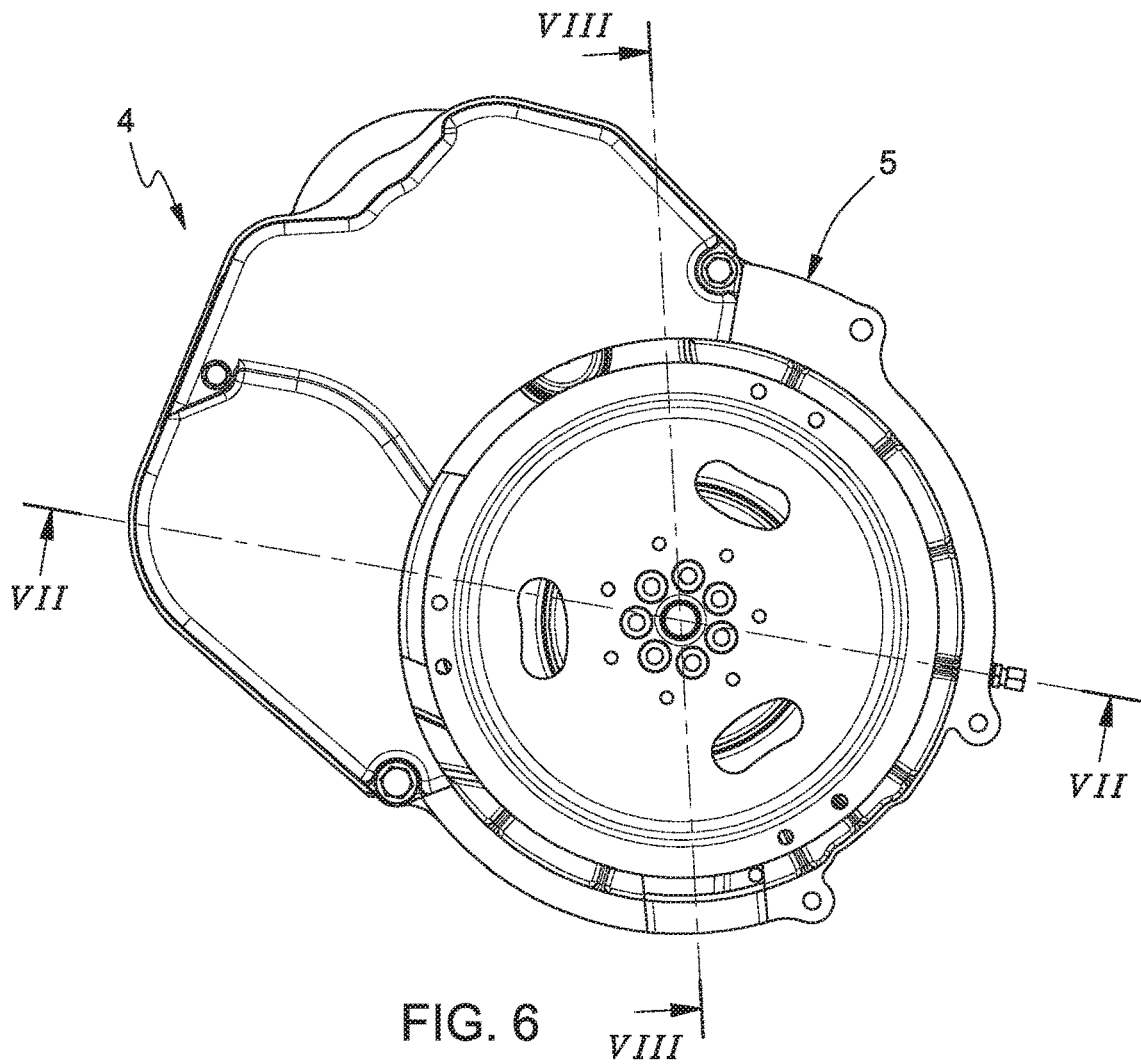

In the example illustrated, as can be clearly seen in FIGS. 2, 4 and 9, the transmission 6 comprises a first pulley 20 with axis A selectively connectable to the crankshaft 7 by means of a decoupling clutch 21, also forming part of the hybrid unit 4, and a torsional vibration damper 22 (FIGS. 7 and 8) described in detail below.

Figure 10:
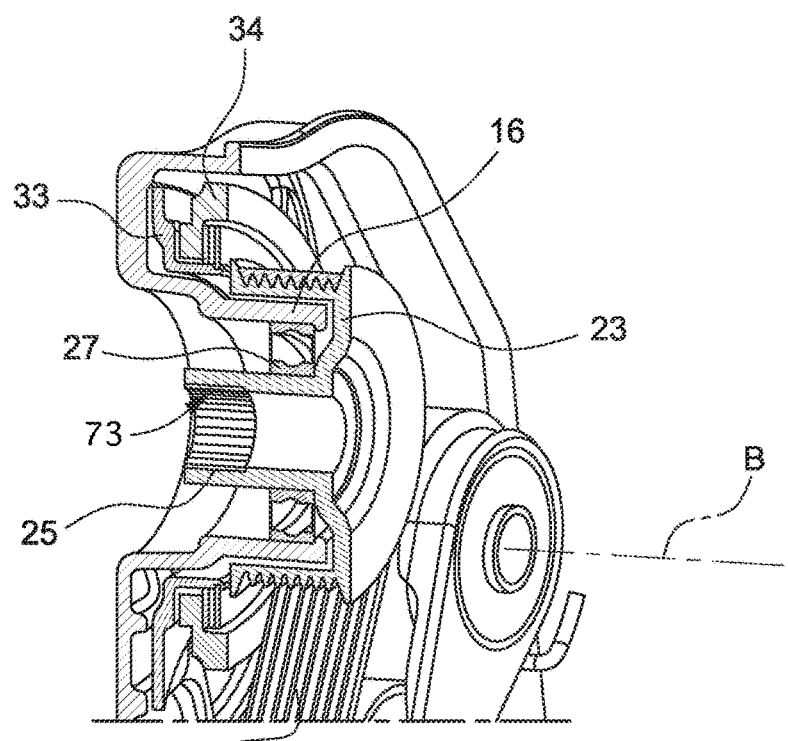
FIG. 10 and FIG. 11 are perspective views of respective details of the unit of FIG. 9.
Figure 11:
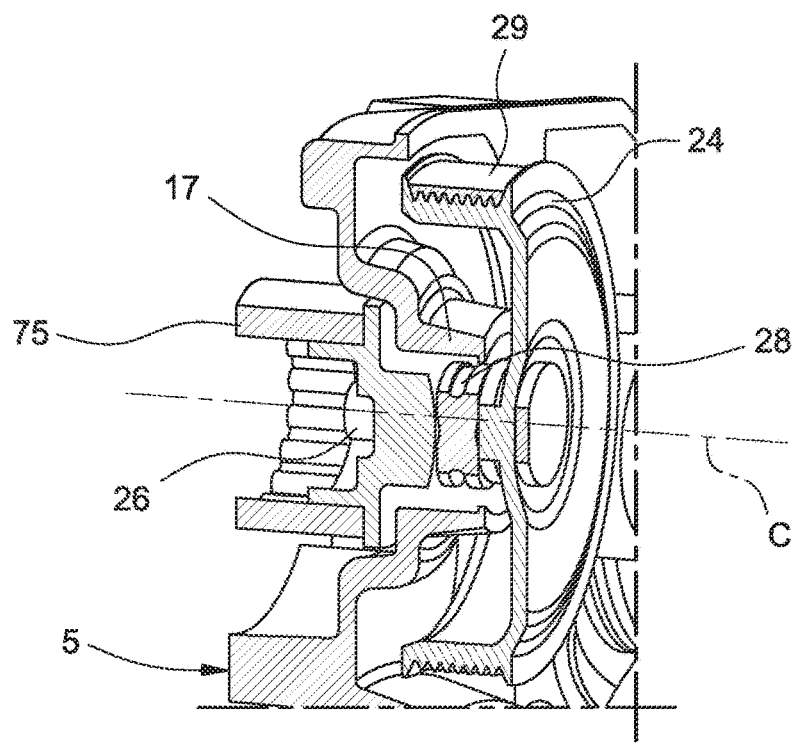

The transmission 6 further comprises a second pulley 23 having axis B adapted to be connected to the electric machine 2, and a third pulley 24 having axis C adapted to be connected to the compressor 3. For this purpose, the second pulley 23 and the third pulley 24 are provided with respective shafts 25, 26 which are housed in the respective tubular appendages 16, 17 and are supported therein by means of respective bearings 27, 28 (FIGS. 10 and 11).

The transmission 6 comprises a belt 29, preferably of poly-V type, which is wound around the pulleys 20, 23 and 24 and rotationally connects them to one another.

Lastly, the transmission 6 comprises a tensioner 30 with double arm having a first tensioner pulley 31 and a second tensioner pulley 32 which act on sections 29a, 29b of the belt 29 between the second pulley 23 and the third pulley 24 and, respectively, between the first pulley 20 and the second pulley 23 under the thrust of elastic means not illustrated.

The tensioner 30 comprises (FIGS. 4 and 10):
an annular base 33 fixed to the structure 5 around the tubular appendage 16,
a first annular arm 34 revolving on the base 33, on which the first tensioner pulley 31 is supported idle in an eccentric position, and
a second arm 35 having a first tubular end 36 hinged to the first arm 20 and a second end 37 on which the second tensioner pulley 32 is mounted idle.

The cited elastic means can consist of a spring (not illustrated) housed in the first end 36 of the second arm 35, which is configured so as to push the second arm 35 towards the first tensioner pulley 31.

Alternatively to the example described, the tensioner can be of any other type with double arm adapted to maintain a sufficient level of tension in the two sections 29a and 29b of the belt 29, each of which can be the slack section of the belt 29 depending on the operating conditions.

According to the description, the belt 29 can be pre-mounted on the support structure 5 and tensioned prior to assembly of the support structure 5 on the engine E.

As can be clearly seen in FIG. 8, the base wall 8 is shaped so as to define, on the opposite side of the transmission 6, a housing 38 for the clutch 21. The clutch 21 can be part of the module 1 or, as in the example described, a unit distinct from the module 1 and complementary to it. In any case, due to the housing of the clutch 21 in the support structure 5 of the module 1, which is shaped in a complementary manner to the clutch 21 on the side facing the latter, no additional axial dimensions are created.

The tubular appendage 15 (FIG. 8) has a substantially C-shaped section open towards the housing 38 so as to define an annular seat 39 communicating with the latter. The seat 39 houses a hydraulic actuator 41 for control of the clutch 21. Expediently, the support structure 5 defines an internal channel 44 for the supply/discharge of oil from the chamber 39 of the actuator 41; the channel 44 establishes communication between the chamber 39 and a radial fitting 45 arranged on the perimeter flange 9 of the support structure 5 and adapted to be connected with a hydraulic control circuit. In this way, additional dimensions are avoided, in particular axial dimensions, for the actuator 41 and the relative control circuit. The internal channel is expediently defined by two or more holes that can be made from the outside by means of conventional boring operations and intersecting with each other so as to define a continuous path between the fitting 45 and the chamber 39; the inlets of the holes can be closed by plugs, where necessary.

The clutch 21, described here summarily insofar as necessary for understanding of the present invention but not forming part of the invention, essentially comprises a first disc 46 adapted to be fixed to the crankshaft 7 and a second disc 47 connected in an angularly integral but axially free manner to a shaft 48 of the damper 22, with axis A, by means of a splined coupling 59 (FIG. 8).

Figure 7:
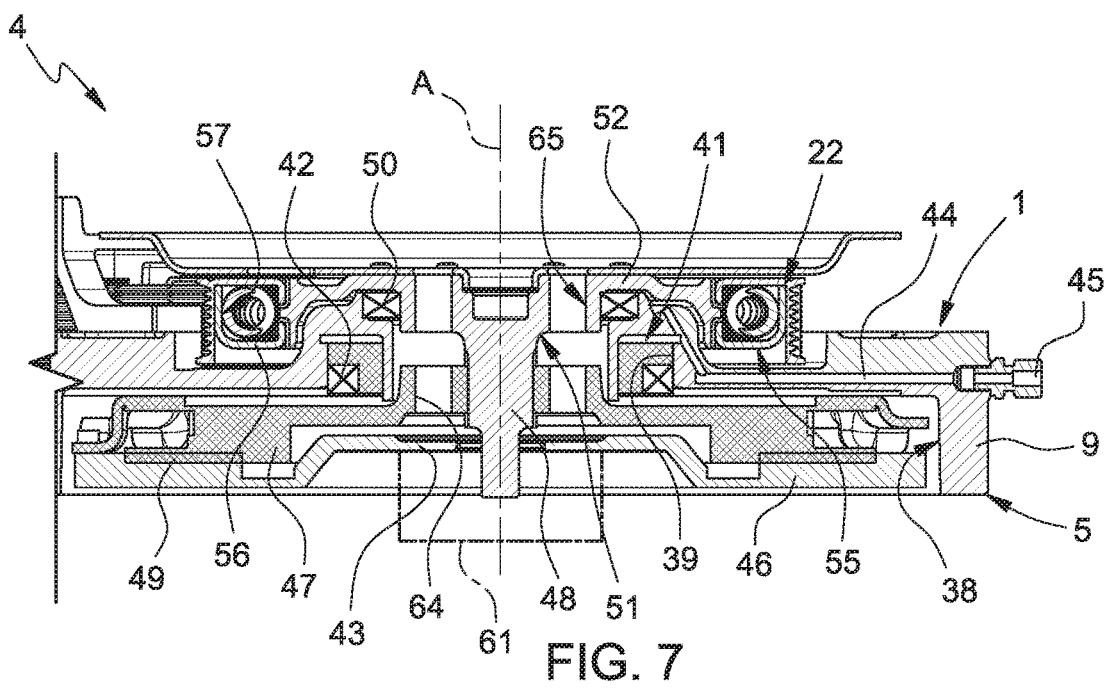

More precisely, as can be clearly seen in FIG. 7, the first disc 46 of the clutch 21 is provided with a series of holes 43 for fastening to an end flange 61 of the crankshaft 7 by means of a corresponding series of screws 62 (FIG. 9) provided with respective heads 63.

Between the discs 46 and 47 of the clutch 21 one or more friction discs 49 are interposed. The clutch 21 is kept normally closed by elastic means not illustrated and rotationally connects the shaft 48 of the damper 22 to the crankshaft 7 in the absence of operation of the actuator 41; when the actuator 41 is hydraulically operated, it opposes the elastic closing force, so as to separate the second disc 47 from the first disc 46. Between the actuator 41 (rotationally fixed) and the second disc 47 (rotating) a bearing 42 is interposed which allows the transmission of axial loads and the relative rotation.

Figure 12:
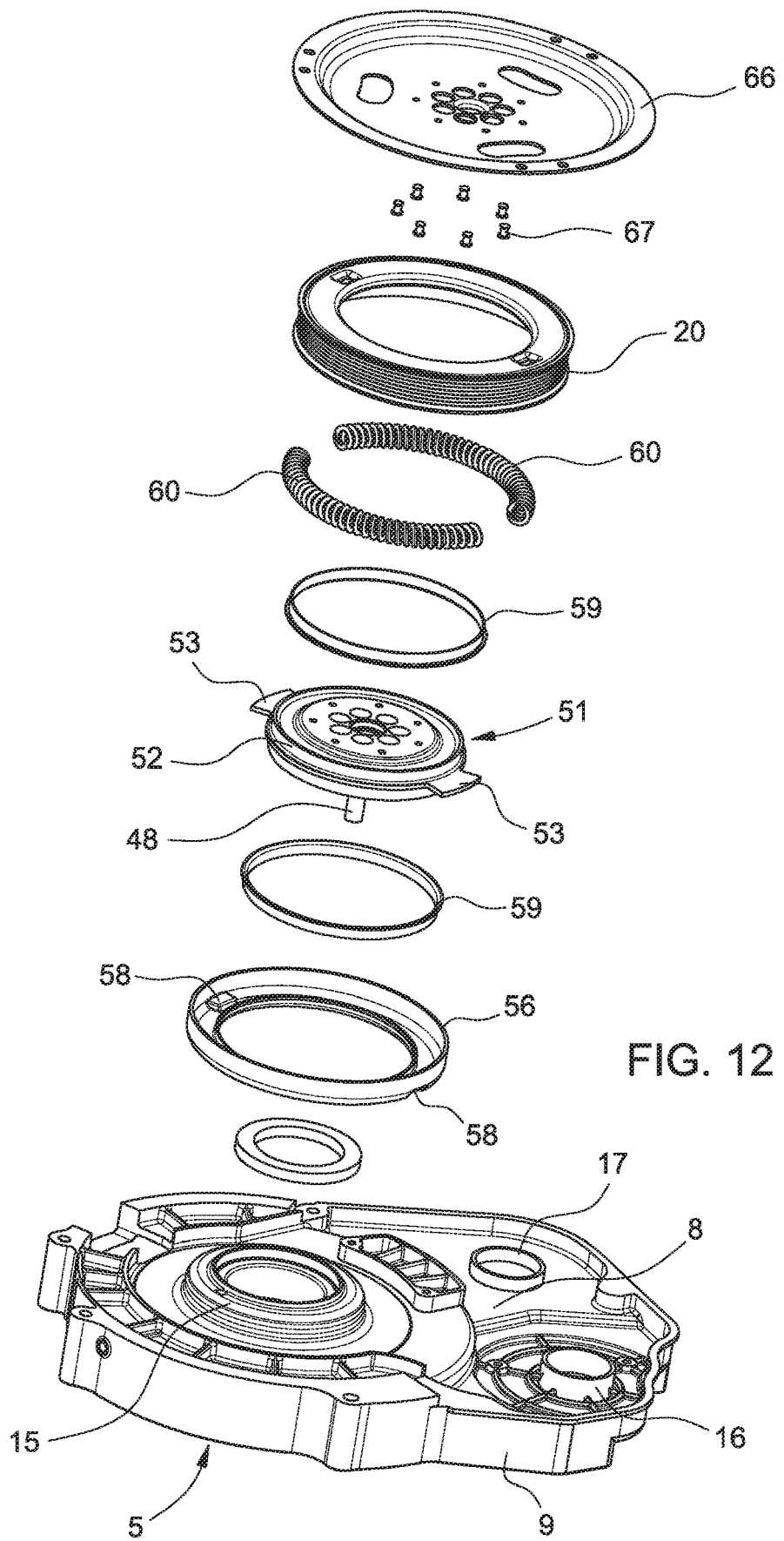
FIG. 12 is an exploded perspective view of a damper of the transmission module of FIG. 1.
Figure 13:
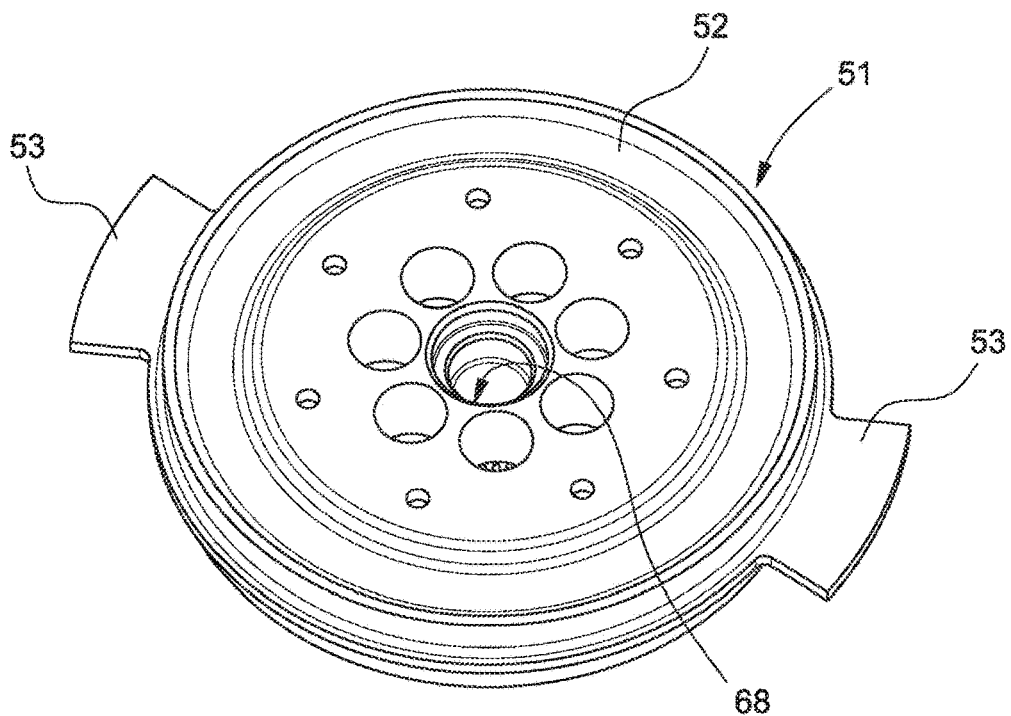
FIG. 13 and FIG. 14 are perspective views from the opposite sides of a detail of the damper of FIG. 12.
Figure 14:
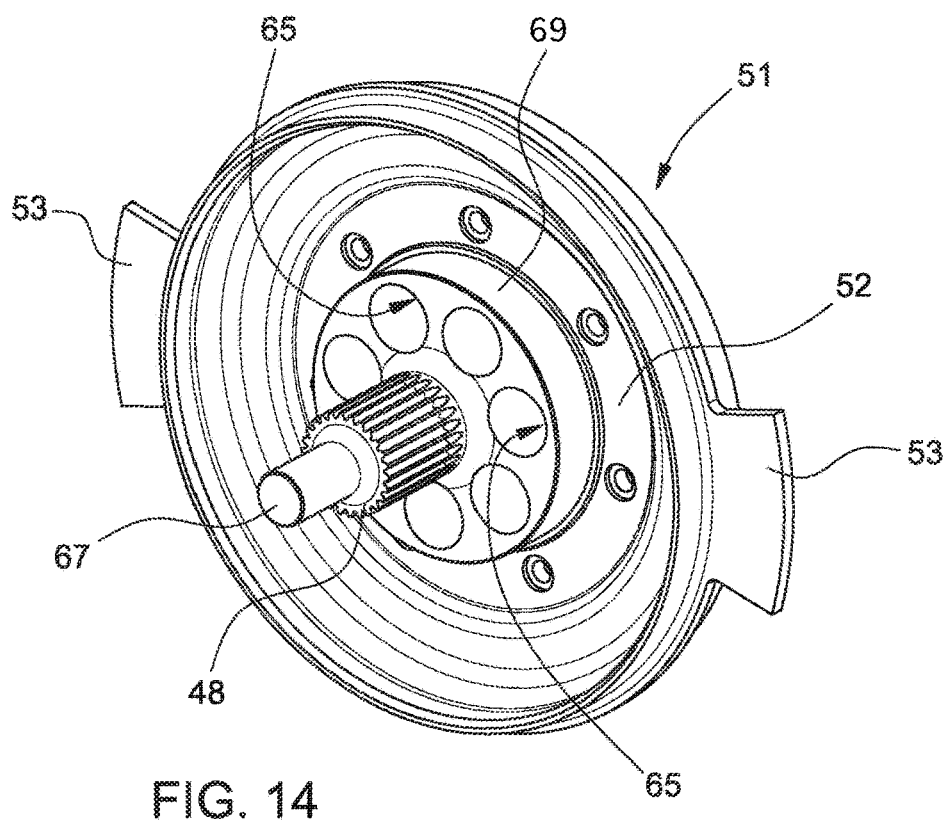

The damper 22 is illustrated in greater detail in FIGS. 12, 13 and 14, and comprises an actuator 51 provided with a disc 52 connected rigidly (and preferably integrally) to the shaft 48, and provided with two radial spokes 53. The actuator 51 is supported on the tubular appendage 15 by a bearing 50.

The damper 22 further comprises an annular casing 55 formed of a half-shell 56 housed inside the first pulley 20 and of the latter.

The casing 55 delimits an annular chamber 57 divided by diametrically opposite internal lugs 58 of the half-shell 56 and of the first pulley 20 in two substantially semicircular housings, inside which respective arched springs 60 are arranged. The spokes 53 of the disc 52 of the actuator 51 run inside the annular chamber 57 and are comprised between respective ends of the springs 60, which stop against the lugs 58 so as to rotationally couple in an elastic manner the first pulley 20 to the actuator 51, and therefore to the second disc 47 of the clutch 21 rotationally integral with the shaft 48 of the actuator 51.

The half-shell 56 and the pulley 20, integral with each other by press-fitting and/or welding, are supported in a revolving manner with respect to the disc 52 of the actuator 51 by means of a pair of rings 59 having the function of plain bearings (FIG. 12).

Expediently, the second disc 47 of the clutch 21 and the disc 52 of the actuator 51 of the damper 22 are provided with corresponding series of holes 64, 65 having position corresponding to that of the holes 43 and diameter sufficient to allow passage of the heads 63 of the screws 62 for fastening the first disc 46 to the flange 61 of the crankshaft 7.

A flex plate 66 is fixed to the disc 52 of the actuator 51 constituting the interface member between the module 1 and the transmission T.

In particular, the flex plate 66 is connected to the disc 52 by means of a plurality of rivets 67 in the vicinity of an inner edge thereof, and is adapted to be connected to a torque converter of the transmission T (not illustrated) at an outer edge thereof. The flex plate 66 is able to compensate slight relative axial displacements between the module 1 and the transmission T.

The actuator 51, in addition to providing the kinematic functions described, has a crucial role in the relative centring of the elements of the hybrid drive unit H and therefore in facilitating the assembly operations.

In particular, with reference to FIGS. 13 and 14, the shaft has at an end thereof a cylindrical centring nose 67 adapted to couple slidingly with a centring hole of the crankshaft 7; at an opposite end, the actuator 51 has a blind axial hole 68 adapted to couple with a corresponding centring nose (not illustrated) of the torque converter.

The actuator 51 further defines the seat 69 for the bearing 50 (and therefore the centring with respect to the support structure 5) and circular lug 70 for centring the flex plate 66.

With reference to FIGS. 9 and 10, the electric machine 2 is provided with a casing 71 and a rotor (not illustrated) to which a splined shaft 72 is connected. The latter slidingly engages a splined inner portion 73 of the shaft 25, so as to accomplish with it an angular but axially free coupling.

With reference to FIGS. 9 and 11, the compressor 3 is provided with a casing 73 and a rotor (not illustrated) to which a splined shaft 74 is connected. The latter slidingly engages an internally splined sleeve 75 rigidly connected to the shaft 26, so as to accomplish with said sleeve an angular but axially free coupling.

As described previously, the connection of the module 1 to the clutch 21, to the electric machine 2 and to the compressor 3 is made by simple axial coupling of the relative rotating members with respective members of the module 1 appropriately configured (shaft 48, shaft 25, sleeve 75). Said members therefore constitute real "power ports" of the module 1, to which the units complementary to the module can be connected extremely easily and with which they can exchange mechanical power.

This considerably facilitates the assembly operations, since the electric machine 2 and the compressor 3 can be connected to the module 1 before or after fixing of the latter to the engine E; alternatively, the electric machine 2 and the compressor 3 could be fixed directly to the engine E.

Analogously, the clutch 21 can be fixed to the module 1 prior to assembly of the latter on the engine or can be fixed on the engine prior to assembly of the module 1, during which the shaft 48 is coupled to the clutch 21.

The operation of the transmission module 1, already partly evident from the previous description, is the following.

When the clutch 21 is closed, the actuator 51 is connected both to the internal combustion engine (E) and to the electric machine 2 by means of the damper 22, known per se, and the transmission 6, in addition to the vehicle transmission T by means of the flex plate 66.

In this condition, the electric machine 2 can be used both as a generator (for recharging the battery with the internal combustion engine on, or as regenerative brake) and as a motor for starting the internal combustion engine or for delivery of an additional torque with the internal combustion engine on (boosting).

When the clutch 21 is open, the electric motor can be used for electric drive, electric braking and coasting with the internal combustion engine off.

From an examination of the characteristics of the module 1 produced according to the present invention, the advantages it offers are evident.

In particular, the use of a module provided with a tray-like support structure with housings for the decoupling clutch and the respective actuator, with axial coupling "power ports" for connection of the module to the decoupling clutch, to the electric machine and to one or more auxiliaries and a preassembled transmission, facilitates installation of the module 1 on the engine E.

Due to the axial interpenetration between the coupling clutch 21 and the module 1, and the incorporation of the seat for the clutch actuator and the relative channels in the support structure 5, additional axial dimensions typical of the known solutions are avoided.

Figure 15:
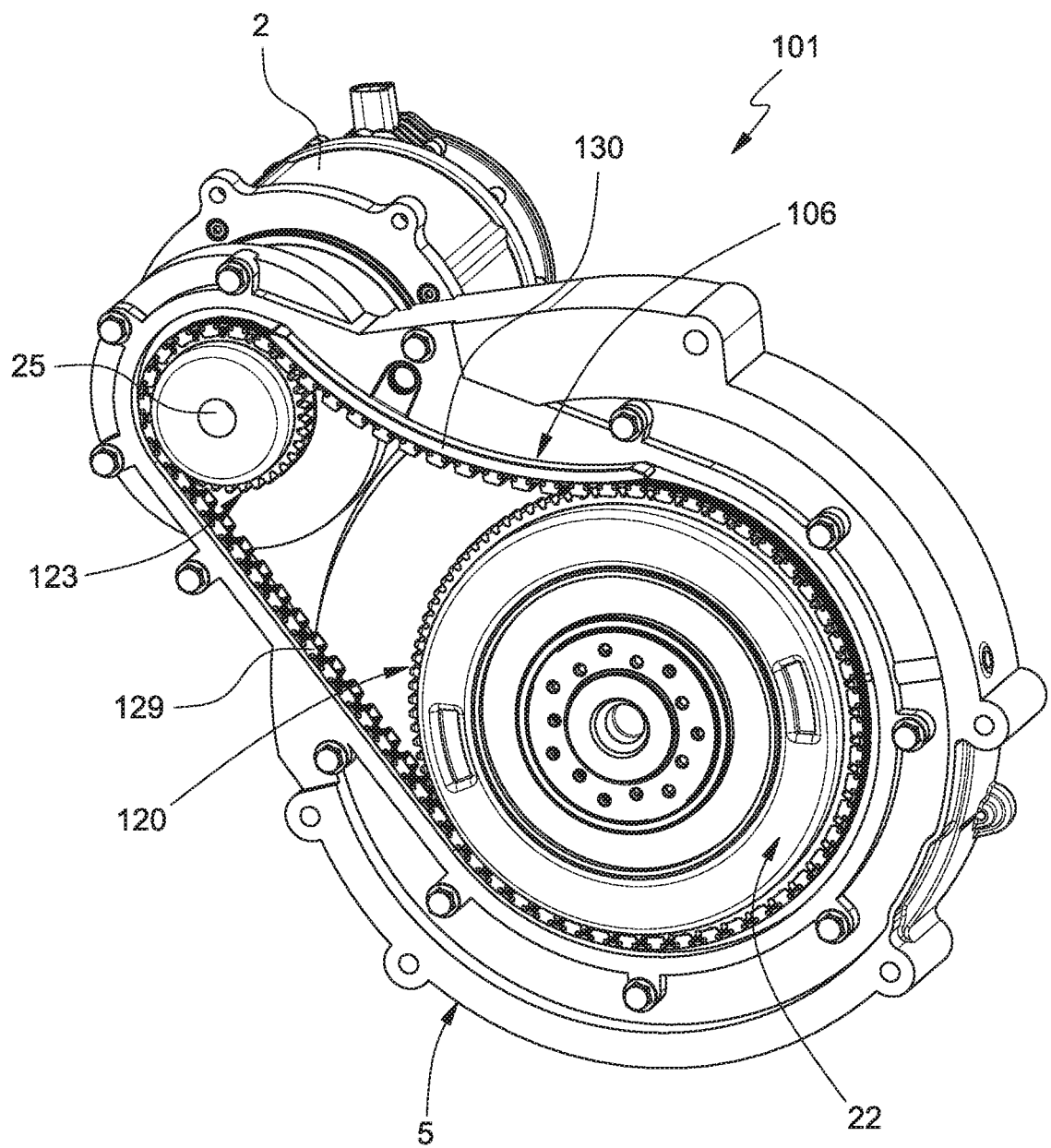
FIG. 15 is a perspective view of a second embodiment of the transmission module according to the invention.

FIG. 15 illustrates an embodiment variation of the module 1, indicated overall by the number 101, and described below in the aspects in which it differs from the module 1.

Elements that are different but corresponding to those already described with reference to the module 1 are indicated by the same reference numbers, increased by 100; the same reference numbers are used to indicate parts identical to parts already described.

In the module 101, the belt transmission 6 is replaced by a chain transmission 106. Furthermore, the module 101 is without compressor which can, for example, be arranged on the side of the engine opposite the transmission and driven by an accessories transmission of conventional type.

The transmission 106 comprises a crown 120 with axis A associated with the damper 22, and a pinion 123 with axis B adapted to be connected to the electric machine 2 by means of a shaft 25 supported in the support structure 5 as described.

The transmission 106 comprises a transmission chain 129, which is wound around the crown 120 and the pinion 123, and rotationally connects them to each other.

The transmission 106 lastly comprises a shoe tensioner 130, of known type, cooperating slidingly with the transmission chain 129 throughout the section between the pinion 123 and the crown 120, with reference to the feed direction of the chain 129, to ensure correct engagement with the pinion 123 and the crown 120.

The chain transmission operates expediently in an oil bath, and therefore must be provided with means for supply of lubrication oil inside the support structure 5 of the module (of conventional type and not illustrated).

Otherwise, the structure and operation of the module 101 are identical to those of the module 1.

Lastly it is clear that modifications and variations can be made to the modules 1, 101 described that do not depart from the protective scope defined by the claims. In particular, the power ports can be made in another way, on condition they allow rotational coupling of the complementary members by means of simple axial insertion.

Furthermore, the transmission 6 or 16 can be replaced by a gear transmission comprising a first gear wheel associated with the damper 22, a gear wheel integral with the shaft 25, and an intermediate gear wheel to transmit the motion from the first to the second gear wheel. Also in this case means for lubrication of the transmission must be provided.

The invention claimed is:

1. A transmission module for a hybrid drive vehicle configured to be interposed between an internal combustion engine and a vehicle transmission, the transmission module comprising:

a tray-like support structure configured to be secured to the internal combustion engine and defining a housing for a decoupling clutch configured to be interposed between a crankshaft of the internal combustion engine and said transmission module and a seat for a control actuator of the decoupling clutch axially communicating with said housing, a first power port for connection to an output member of the decoupling clutch,
at least a second power port for connection to an electric machine, and
a module transmission comprising a first transmission member connected to the first power port by means of a torsional vibration damper, a second transmission member connected to the second power port, and transmission means for rotationally coupling said transmission members to one another;
wherein the first and second power ports are configured so as to be couplable with respective rotating members of the decoupling clutch and of the electric machine by means of respective axially sliding couplings.

2. The module as claimed in claim 1, characterized in that said housing is configured to house said decoupling clutch so that the axial dimension of the decoupling clutch is accommodated within that of the transmission module.

3. The module as claimed in claim 1, characterized in that the support structure is provided with internal channels for connecting the actuator to a hydraulic control circuit.

4. The module as claimed in claim 1, characterized in that the transmission module transmission is pre-assemblable on the support structure before the latter is mounted on the internal combustion engine.

5. The module as claimed in claim 1, characterized in that the damper includes an actuator provided with a splined shaft defining the first power port and elastic elements interposed between the actuator and the first transmission member.

6. The module according to claim 5, characterized in that the actuator of the damper comprises a disc integral with the shaft and provided with two radial spokes, and an annular casing integral with the first transmission member and defining an annular chamber within which the spokes run, wherein the annular casing comprises a first internal stop and a second internal stop, and the elastic means comprises at least one pair of arch springs housed in the annular chamber and suitable for interposing between the spokes and the first and second internal stops of the annular casing.

7. The module as claimed in claim 5, characterized in that the disc of the actuator is provided with a plurality of axial holes for the passage of screws for fixing the decoupling clutch to the internal combustion engine.

8. The module as claimed in claim 5, characterized in that said actuator of the damper is supported in the support unit of the transmission module by means of a bearing, and has centering means for centering with respect to the crankshaft and to the vehicle transmission.

9. The module according to claim 1, characterized in that said module transmission is a belt transmission, and said transmission members are pulleys connected to each other by a belt.

10. The module as claimed in claim 1, characterized in that said module transmission is a chain transmission, and said first and second transmission members consist of a crown and a pinion connected to each other by a chain.

11. The module as claimed in claim 9, characterized in that the module transmission comprises a tensioner.

12. The module as claimed in claim 1, characterized in that said module transmission is a gearing transmission.

13. The module as claimed in claim 11, characterized in that it comprises means for lubricating the module transmission.

14. The module as claimed in claim 1, characterized in that the module transmission comprises at least a third power port for the connection of an auxiliary member, the module transmission comprising a third transmission member rotationally connected to the first transmission member and to the second transmission member by said transmission means.

15. The module according to claim 1, characterized in that it comprises a flex plate connected to the actuator of the damper and configured to be connected to the vehicle transmission.

16. A hybrid unit comprising:
a decoupling clutch comprising a control actuator, a rotating member, and an output member;
an electric machine comprising a rotating member; and
a transmission module comprising:
a tray-like support structure configured to be secured to an internal combustion engine and defining a housing having received therein the decoupling clutch for interposition between a crankshaft of the internal combustion engine and said transmission module and defining a seat for the control actuator of the decoupling clutch axially communicating with said housing,
a first power port connected to the output member of the decoupling clutch,
at least a second power port connected to the electric machine, and
a module transmission comprising a first transmission member connected to the first power port by means of a torsional vibration damper, a second transmission member connected to the second power port, and transmission means for rotationally coupling said transmission members to one another;
wherein the first and second power ports are configured so as to be couplable with respective rotating members of the decoupling clutch and of the electric machine by means of respective axially sliding couplings.

17. The hybrid unit as claimed in claim 16, characterized in that it comprises at least one accessory connected to the third power port of the transmission module.

18. A method for assembling a hybrid drive unit of a vehicle comprising a hybrid unit according to claim 16, characterized in that it comprises the steps of:
assembling the transmission module;
connecting an electric machine to the second power port of the transmission module; and
mounting the support structure of the transmission module to an internal combustion engine.

19. The method as claimed in claim 18, characterized in that it comprises the step of connecting the decoupling clutch to the first power port of the transmission module before or during the assembly step of the support structure of the transmission module to an internal combustion engine.

20. The method as claimed in claim 18, characterized in that the step of mounting the support structure on the internal combustion engine is carried out before the steps of connecting the electric machine and, optionally, the accessory to the respective power ports.

21. The method as claimed in claim 18, characterized in that the step of mounting the support structure on the internal combustion engine is carried out after the steps of connecting the electric machine and, optionally, the accessory to the respective power ports.

* * * * *